(12) United States Patent
Hermani et al.

(10) Patent No.: US 11,925,999 B2
(45) Date of Patent: Mar. 12, 2024

(54) WORKPIECE PROCESSING MACHINE AND METHOD FOR PROCESSING A WORKPIECE, IN PARTICULAR BY WELDING

(71) Applicant: TRUMPF Laser- und Systemtechnik GmbH, Ditzingen (DE)

(72) Inventors: Jan-Patrick Hermani, Markgroeningen (DE); Steffen Kessler, Stuttgart (DE); Friedhelm Dorsch, Stuttgart (DE); Holger Braun, Ditzingen (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 896 days.

(21) Appl. No.: 16/849,002

(22) Filed: Apr. 15, 2020

(65) Prior Publication Data

US 2020/0238436 A1 Jul. 30, 2020

Related U.S. Application Data

(63) Continuation of application No. PCT/EP2018/077619, filed on Oct. 10, 2018.

(30) Foreign Application Priority Data

Oct. 17, 2017 (DE) .......................... 102017218494.9

(51) Int. Cl.
*G01B 9/02* (2022.01)
*B23K 26/04* (2014.01)
(Continued)

(52) U.S. Cl.
CPC .......... *B23K 26/043* (2013.01); *B23K 26/062* (2015.10); *B23K 26/0626* (2013.01);
(Continued)

(58) Field of Classification Search
CPC ................ B23K 26/043; B23K 26/062; B23K 26/0626; B23K 26/0643; B23K 26/0648;
(Continued)

(56) References Cited

U.S. PATENT DOCUMENTS 5,781,297 A * 7/1998 Castore .............. G01B 11/2441
356/486
6,686,997 B1 2/2004 Allen
(Continued)

FOREIGN PATENT DOCUMENTS

BG 110789 6/2012
CN 1575412 2/2005
(Continued)

OTHER PUBLICATIONS

CN Office Action in Chinese Appln. No. 201880068014.3, dated May 28, 2021, 30 pages (with English translation).
(Continued)

*Primary Examiner* — Uzma Alam
*Assistant Examiner* — Jonathon Cook
(74) *Attorney, Agent, or Firm* — Fish & Richardson P.C.

(57) ABSTRACT

A workpiece processing machine that includes: a beam emission head for providing a beam for processing the workpiece, an optical interferometer for splitting, redirecting, and detecting the beam, an adjustment element for changing a second portion of a power of the beam redirected from a retroreflector to a detector, and a control unit for actuating the adjustment element to control a ratio between a first power portion of the beam redirected from the workpiece to the detector and the second power portion of the beam redirected from the retroreflector to the detector to a target ratio.

32 Claims, 3 Drawing Sheets

(51) Int. Cl.
  *B23K 26/06* (2014.01)
  *B23K 26/062* (2014.01)
  *B23K 26/067* (2006.01)
  *B23K 26/70* (2014.01)
  *G01B 9/02055* (2022.01)
  *G01B 9/02091* (2022.01)
  *G02B 27/28* (2006.01)

(52) U.S. Cl.
  CPC ...... *B23K 26/0643* (2013.01); *B23K 26/0648* (2013.01); *B23K 26/0665* (2013.01); *B23K 26/067* (2013.01); *B23K 26/705* (2015.10); *G01B 9/02044* (2013.01); *G01B 9/02067* (2013.01); *G01B 9/02091* (2013.01); *G02B 27/283* (2013.01)

(58) Field of Classification Search
  CPC .............. B23K 26/0665; B23K 26/067; B23K 26/705; G01B 9/02044; G01B 9/02067; G01B 9/0209; G01B 9/02091
  See application file for complete search history.

(56) References Cited

U.S. PATENT DOCUMENTS

| | | | |
|---|---|---|---|
| 7,030,989 | B2 | 4/2006 | Yager et al. |
| 8,410,392 | B2 | 4/2013 | Kogel-Hollacher et al. |
| 9,784,562 | B2 | 10/2017 | Lessmueller et al. |
| 10,449,631 | B2 | 10/2019 | Kogel-Hollacher et al. |
| 2008/0175465 | A1 | 7/2008 | Jian et al. |
| 2009/0145888 | A1 | 6/2009 | Hesse et al. |
| 2012/0138586 | A1 | 6/2012 | Webster et al. |
| 2013/0010302 | A1* | 1/2013 | Sharma ............ G01B 9/02091 356/479 |
| 2014/0362383 | A1* | 12/2014 | Haitjema ............ G02B 27/10 356/450 |
| 2015/0241201 | A1 | 8/2015 | Suzuki et al. |
| 2016/0039045 | A1* | 2/2016 | Webster ............ G01B 11/22 356/450 |
| 2016/0059347 | A1* | 3/2016 | Kogel-Hollacher ........ B23K 26/082 219/121.73 |
| 2016/0183801 | A1 | 6/2016 | Hogan |
| 2016/0356595 | A1* | 12/2016 | Lessmueller ....... B23K 26/044 |
| 2017/0167848 | A1 | 6/2017 | Kobayashi et al. |

FOREIGN PATENT DOCUMENTS

| | | |
|---|---|---|
| CN | 1717581 | 1/2006 |
| CN | 105842705 | 8/2021 |
| DE | 102013008269 A1 | 11/2014 |
| DE | 102015007142 A1 | 12/2016 |
| EP | 2062674 A1 | 5/2009 |
| EP | 1977850 B1 | 4/2013 |
| WO | WO 2014/138939 A1 | 9/2014 |
| WO | WO 2019/076701 A1 | 4/2019 |

OTHER PUBLICATIONS

DE Office Action in German Appln. No. 1102017218494.9, dated Nov. 17, 2022, 14 pages (with English translation).
CN Office Action in Chinese Appln. No. 201880068014.3, dated Sep. 9, 2022, 17 pages (with English translation).
PCT International Search Report and Written Opinion in International Appln. No. PCT/EP2018/077619, dated Feb. 11, 2019, 18 pages (with English translation).
KR Office Action in Korean Appln. No. 1020207013721, dated Feb. 22, 2023, 10 pages (with English translation).

* cited by examiner

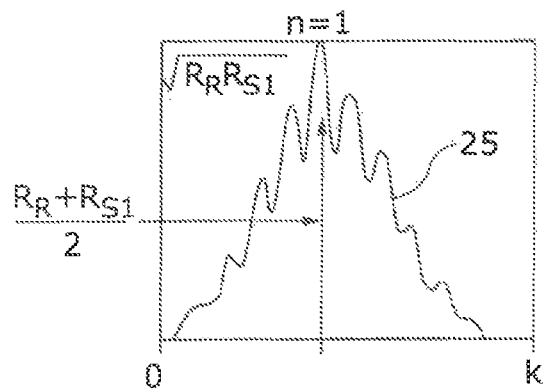 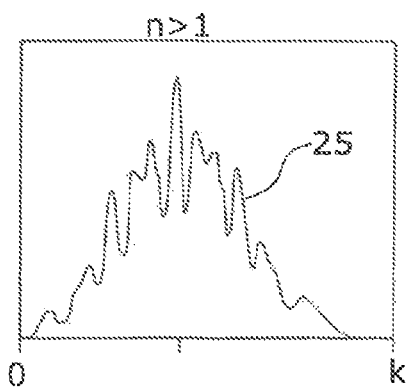
Fig. 4A  Fig. 4B
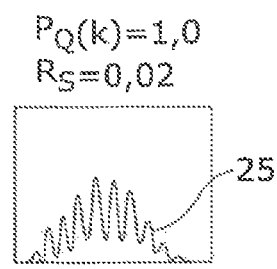 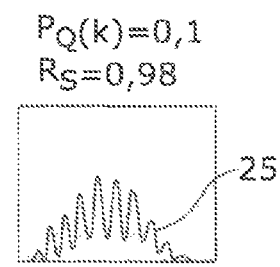
Fig. 5A  Fig. 5B

WORKPIECE PROCESSING MACHINE AND METHOD FOR PROCESSING A WORKPIECE, IN PARTICULAR BY WELDING

CROSS REFERENCE TO RELATED APPLICATIONS

This application is a continuation of and claims priority under 35 U.S.C. § 120 from PCT Application No. PCT/EP2018/077619 filed on Oct. 10, 2018, which claims priority from German Application No. 10 2017 218 494.9, filed on Oct. 17, 2017. The entire contents of each of these priority applications are incorporated herein by reference.

TECHNICAL FIELD

The present invention relates to a workpiece processing machine for processing a workpiece, in particular by welding using a laser beam.

BACKGROUND

From EP 1 977 850 B1 a machining unit for machining workpieces having a light-opaque surface is known, which comprises a machining head for providing a machining beam, in particular an electron beam or laser beam. A scanning unit, which is provided for surface scanning, designed as an optical coherence tomography unit is associated with the machining head.

A machining head for a laser workpiece processing machine is described in DE 10 2013 008 269 A1, which comprises an optical coherence tomography unit, which is configured to measure a distance between the machining head and the workpiece, wherein measurement light generated by a measurement light source, which has been reflected from the workpiece, interferes with measurement light, which has covered an optical path length in a reference arm, in the optical coherence tomography unit. A path length modulator is arranged in the reference arm, which adjusts the optical path length in the reference arm synchronously with and in dependence on a change of the focal length of a focusing optical unit of the machining head.

A device for monitoring and characterizing the dynamics of a phase change region (PCR) by means of interferometric methods is described in WO 2014/138939 A1, wherein the PCR is produced during laser welding, especially during keyhole welding. Due to the alignment of a measurement beam at multiple locations inside and overlapping with the PCR, the device can be used to determine spatial and temporal characteristics of the welding in real time, for example, depth, length, width, and geometry of the keyhole, and also information about whether the keyhole is unstable, is closing, or is collapsing. A part of a reference arm can be adapted to configure the desired amount of the power of a reference signal in the interferometric measurement.

Methods and devices for the use of optical interferometry in the context of material modification processes, especially in the context of welding processes, are known from US 2012/0138586 A1. A controller controls at least one machining parameter of the material modification process in dependence on an output signal of an optical interferometer.

A polarized interferometric optical system, in particular an optical coherence tomography system, which has an improved signal-to-noise ratio, is known from US 2016/0183801 A1. The angle alignment of a polarizer, which is arranged in an optical beam before a polarization beam splitter, determines the splitting of the power of the optical beam into reference beam and test beam (power ratio), whereby the signal-to-noise ratio is influenced, which is also dependent, inter alia, on the scattering properties of the sample.

A method for setting up and carrying out a laser welding process is described in EP 2 062 674 A1. For a seam location control, the position of a joint is detected in a first measurement region leading in relation to the laser beam position (pre-process), the laser beam position is detected in a second measurement region (in-process), and a weld seam is detected in a third measurement region trailing in relation to the laser beam position (post-process). The detection can be carried out, for example, by means of a light section method.

In the case of the detection of the pre-process, in-process, and post-process in a welding process, the reflectivity or reflectance in the keyhole (in the capillary) typically differs from the reflectance on the upper side of the workpiece.

SUMMARY

Object of the Invention

The invention is based on the object of providing a workpiece processing machine and an associated method, which increase the signal quality and/or the signal-to-noise ratio in the interferometric measurement on the workpiece.

Subject Matter of the Invention

This object is achieved according to the invention by a workpiece processing machine for the machining of a workpiece, in particular by means of welding, comprising: a machining head for providing a machining beam, and an optical interferometer, in particular an optical coherence tomography unit, comprising: a beam source for generating radiation having a source power, a beam splitter unit for splitting the source power of the beam source between a reference path, in which a retroreflector is arranged, and a measurement path, in which the workpiece is arranged, and a detector for detecting a total power of the (interfering) radiation, which is reflected and/or scattered to the detector from the workpiece in the measurement path and from the retroreflector in the reference path. The workpiece processing machine further comprises: an adjustment element for changing a power portion of the radiation reflected and/or scattered from the retroreflector to the detector of the total power of the radiation incident on the detector, and a control unit for acting on the adjustment element to control a ratio between a power portion of the radiation reflected and/or scattered from the workpiece to the detector and the power portion of the radiation reflected and/or scattered from the retroreflector to the detector to a (pre-definable) target ratio.

During the measurement of a workpiece, more precisely during the measurement of the surface of a workpiece, which is machined by welding, for example, different light conditions typically occur depending on whether the workpiece is measured leading in relation to a position of the machining beam on the workpiece, trailing in relation to the position of the machining beam, or at the position of the machining beam itself. If the measurement or the scanning of the workpiece is performed, for example, with the aid of a light section method, as described in EP 2 062 674 A1 cited at the outset, the amount of light of the detected radiation can thus be adapted by a change of the exposure time, in order to optimally utilize the contrast range of the employed sensor and/or detector in this manner.

In an interferometric method, for example in optical coherence tomography, a simple adaptation of the light quantity and/or the radiation quantity which is incident on the detector is not advantageous, however, since the source power of the beam source is split between the measurement path and the reference path and the respective reflected radiation interferes and is guided jointly—possibly via a spectrometer—to the detector. An increase of the light quantity and/or radiation quantity on the detector due to a longer exposure time or due to an increase of the source power therefore always also changes the light quantity or the power portion of the radiation in the reference path. The inventors have recognized that for the best possible signal quality, a setting or a change of the power portion of the radiation reflected from the retroreflector to the detector of the detected total power is required. It will be understood that in addition the light quantity incident on the detector and/or detected thereby can also be set.

The control unit can be a closed loop control, which possibly comprises not only one, but rather two or more controllers. For the control of the ratio between the power portion of the measurement path and the power portion of the reference path, firstly the power portion $P_R$ of the radiation of the reference path, which is reflected to the detector, can be determined computationally. The power portion $P_M$ of the measurement path can be determined from the (known) total power $P_S$ incident on the detector, which represents the sum of the power portion $P_R$ of the reference path and the power portion $P_M$ of the radiation of the measurement path reflected to the detector ($P_S = P_R + P_M$):

$$P_M = P_S - P_R.$$

In this manner, the (actual) ratio $P_M/P_R$ between the power portion $P_M$ of the radiation reflected from the workpiece to the detector and the power portion $P_R$ of the radiation reflected from the retroreflector to the detector can be determined. The power portion $P_R$ in the reference arm can be changed by the action on the adjustment element to control the (actual) ratio $P_M/P_R$ to a target ratio $P_{MS}/P_{RS}$. The pre-definable target ratio can be empirically determined and in the simplest case can assume a constant value, which is preferably between approximately 0.01 and approximately 100, more preferably between 0.1 and 10, and ideally is $P_{MS}/P_{RS}=1.0$. In addition, it is not reasonable if the power portion $P_M$ in the measurement arm approaches zero nor if the power portion $P_R$ in the reference arm approaches infinity. However, it is possible to adapt the target ratio during the machining of the workpiece, as described in greater detail hereafter.

In principle, the detected total power or the current proportional thereto, which is measured during the (possibly spectral, see below) optical coherence tomography at the detector, is composed of three components: a DC component, a cross-correlation component, and an auto-correlation component. The DC component is a constant component which is determined, for example, by means of a black adjustment before the beginning of the detection or measurement and is filtered out during the measurement from the measurement signal (for example, a measurement current), which is generated by the detector and is typically proportional to the total power. The DC component reduces the contrast range of the detector and should therefore turn out to be as small as possible. The cross-correlation component contains the actual depth information, i.e., the relevant interferometric signal component. The reflection from the measurement path and from the reference path is incorporated as the square root of the individual reflectances in this component. The auto-correlation component contains interference components between various measurement levels (various depths), at which radiation is reflected from the workpiece. The auto-correlation component involves artifacts which corrupt the actual measurement result.

For the case that the reflectance of the workpiece $R_S$ (in a measurement plane) is significantly greater than the reflectance $R_R$ of the retroreflector and/or the total reflectance of the reference path ($R_S \gg R_R$), the power portion $P_R$ of the radiation reflected at the retroreflector to the detector should be increased, since otherwise the auto-correlation component will become excessively large. For the case in which the reflectance $R_S$ of the workpiece is significantly less than the reflectance $R_R$ of the retroreflector, the power portion $P_R$ should be reduced, since otherwise the DC component of the measurement signal will become excessively large.

A beam source which generates coherent radiation, for example, a beam source in the form of a superluminescent diode, is used for optical coherence tomography. In general, a non-position-resolving detector is used as the detector, which converts the incident total power into a generally proportional measurement signal, for example, into a measurement current. In spectrally resolved optical coherence tomography, the reflected radiation can be decomposed into spectral components on a spectrometer, for example, in the form of a grating, wherein the spectral components are detected at multiple detector surfaces of the detector (for example, in a sensor line or diode line), generally not position-resolved in each case. Alternatively or additionally, in spectrally resolved optical coherence tomography, the wavelength of the radiation generated by the beam source can be tuned if it is a beam source tunable in the wavelength. The beam splitter unit can also be used to combine the radiation reflected from the workpiece and from the retroreflector, so that this radiation reaches the detector jointly. However, another optical unit, for example a further beam splitter unit, can optionally be used to combine the reflected radiation from the measurement path and from the reference path.

There are multiple options for the implementation of the adjustment element:

In one embodiment, the adjustment element is designed to change the splitting of the source power of the radiation of the beam source between the reference path and the measurement path. For this purpose, if polarized radiation is used, for example, the beam splitter unit, for example, in the form of a polarization beam splitter, can be rotated around the beam axis of the radiation generated by the beam source. Alternatively or additionally, for example, a polarization filter which is arranged in the beam path from the beam source to the beam splitter unit can be set suitably, for example also by rotating it around the beam axis of the radiation propagating from the beam source to the beam splitter unit, to change the splitting of the source power between the reference path and the measurement path. The beam splitter unit can also be designed to perform the splitting of the source power in another manner, for example, if the beam splitter unit is designed as a rapidly switching beam splitter (for example, in the form of a rotatable prism or an electrically actuated unit). It will be understood that the splitting of the source power with the aid of the beam splitter unit does not necessarily have to be performed by polarization beam splitting, but rather the splitting of the source power can also be performed in another manner, for example, by geometrical beam splitting.

In a further embodiment, the adjustment element is designed to change the power portion of the radiation in the reference path or the power portion in the measurement path. The adjustment element is generally designed in this case as a settable attenuator, i.e., a part of the power portion coupled into the reference path or into the measurement path is lost. In contrast to the above-described embodiment, it is not necessary in this case to use a polarizer before the beam splitter unit, which would reduce the power in the measurement system overall. Moreover, the optical interferometer or the optical coherence tomography unit can optionally be operated using unpolarized radiation. The adjustment element can be arranged permanently in the reference path or in the measurement path or can be introduced, for example, with the aid of an actuator, into the reference path or into the measurement path for the attenuation of the power portion. It is obvious that an adjustment element for the reference path and a further adjustment element for the measurement path can be provided, which cause different changes (i.e., not proportional to one another) of the respective power portion to control the ratio between the two power portions to the target ratio.

In one refinement, the adjustment element is designed to change a reflectivity of the retroreflector arranged in the reference path, in particular the retroreflector can form the adjustment element. The retroreflector, which can be designed, for example, as an end mirror in this case, can itself be used as a polarizer, for example, upon the use of polarized radiation and/or can have a reflectivity dependent on the polarization state of the incident radiation. It will be understood that other reflective elements, for example, in the form of deflection mirrors, can also be arranged in the reference path, the reflectance of which can possibly be changed, for example, by a rotation of the respective deflection mirror around its axis.

In one refinement, the adjustment element is designed to act on a focusing unit to change a focus position of the radiation in the reference path. The focusing unit can be used, for example, to collimate the radiation, which exits divergently from an optical fiber. In this case, the focusing unit is typically arranged in an idle position and/or in a nominal position in such a way that the focus position is located in the plane at the output-side end of the optical fiber. If the focal length of the focusing unit is changed or the distance between the focusing unit and the output-side end of the optical fiber is changed, this thus results in defocusing of the radiation reflected back at the retroreflector, i.e., it is no longer coupled completely into the optical fiber, so that the power portion of the radiation reflected to the detector decreases. The same effect occurs if a focusing unit for focusing the radiation in the reference path on the retroreflector is provided and the focal length of the focusing unit and/or the distance between the focusing unit and the retroreflector is/are changed.

In one refinement, the focusing unit comprises a movable lens, which is in particular displaceable along a beam axis of the reference path. Such a lens can be provided, for example, in the form of a collimation lens in the reference path in any case, to collimate the divergent radiation coupled out from an optical fiber before it is incident on the retroreflector. The power portion in the reference path can be changed in a particularly simple manner by the displacement of such a lens along the beam axis. This also applies for lenses or other focusing optical elements arranged at other locations in the reference path, which can also be displaced along the beam axis of the reference path and in the case of which the displacement causes defocusing and thus attenuation of the power reflected back from the reference path. Alternatively or additionally, a (slight) tilt of the lens with respect to the beam axis can possibly also be performed, which causes a portion of the radiation power to leave the beam path of the reference path.

In a further refinement, the adjustment element comprises an optical filter unit. The optical filter unit can be an optical filter unit having settable transmission and/or attenuation, which is arranged permanently in the reference path. The optical filter unit can also comprise one or more optical filters, however, which are introduced into the measurement path with the aid of at least one actuator to reduce or change the power of the radiation in the reference path.

In a further embodiment, the workpiece processing machine comprises a further adjustment element for changing the source power of the beam source, wherein the control unit is designed to act on the further adjustment element for the control of the total power reflected and/or scattered to the detector below a total power threshold value. The further adjustment element can be, for example, a controllable current source, which provides the current supplied to the beam source. In this manner, for example, if a superluminescent diode is used as the beam source, the diode current and thus the source power can be set. The threshold value of the total power, which is not supposed to be exceeded, typically corresponds to the upper power limit of the detector. In the case of a high reflectivity of the workpiece, the source power should be reduced so as not to exceed the contrast range and avoid saturation of the detector. In the case of a low reflectivity of the workpiece, the source power should be increased to utilize the contrast range as much as possible. As described above, the controlling unit can form a closed loop control. In this manner, in the event of a change of the process parameters, for example, of the workpiece, the angle at which the radiation in the measurement path is incident on the workpiece, etc., an adjustment of the detector can possibly be disposed with.

In a further embodiment, the optical coherence tomography unit is designed for the spectrally resolved detection, i.e., the recording of (at least) one spectrum, of the total power reflected back to the detector. For this purpose, the optical coherence tomography setup can comprise a spectrometer for the spectral decomposition of the radiation reflected back from the measurement path and from the reference path onto multiple measurement channels, in each of which a generally non-position-resolving detector surface is arranged, which corresponds to a specific wavelength or a predetermined wavelength band. The spectrometer can comprise, for example, a diffraction grating, a prism, etc. for the spectral decomposition. The detector can be designed, for example, as a line detector, on which multiple detector surfaces are formed, on each of which radiation is incident at one wavelength or in a (narrow) wavelength band. Alternatively to the use of a spectrometer, which enables the simultaneous detection of multiple wavelengths, a beam source tunable in the wavelength can be used to detect the radiation at different wavelengths in chronological succession. In place of a spectrally resolved measurement, a time-resolved measurement can also be performed, in which the length of the reference arm is varied during the measurement.

In a further embodiment, the workpiece processing machine comprises an evaluation unit for determining at least one parameter of the spectrally resolved total power or a spectrally resolved measurement signal (spectrum) generated therefrom, wherein the control unit is designed to adapt the target ratio and/or the total power (summed over the entire measured spectrum) in dependence on the at least one parameter.

The at least one parameter can be, for example, the product of the reflectivity $R_R$ of the retroreflector and the reflectivity $R_{Sn}$ of the workpiece, more precisely the square root of this product $\sqrt{R_R R_{Sn}}$, wherein the index n stands for different measurement levels of the measurement object or the workpiece, which correspond to different lengths of the measurement path, wherein n=1 refers to the measurement path having the shortest length. n=1 typically denotes the reflected signal of the surface of the workpiece. Analyses of reflections from lower levels are also possible (n>1). The mentioned product or its square root is incorporated into the cross-correlation component, which is to be as large as possible. However, it will be understood that other parameters of the spectrally resolved total power can also be determined, which can be used for the specification and/or the adaptation of the target ratio and/or the total power or for other purposes.

In a further embodiment, the workpiece processing machine additionally comprises a deflection unit for deflecting the radiation in the measurement path at different positions on the workpiece. The deflection unit can be, for example, a scanner unit, which enables the radiation in the measurement path to be deflected at different positions on the workpiece and/or to be aligned onto different positions on the workpiece. Such a scanner unit typically comprises one or possibly multiple scanner mirrors, which are arranged to be rotatable and/or tiltable. The deflection unit can in particular be designed and/or arranged in such a way that it only aligns the radiation generated by the beam source in the measurement path on different positions on the workpiece, but does not influence the machining beam. In this manner, the position of the radiation from the measurement path on the workpiece can be set independently of the position of the machining beam on the workpiece.

In a further embodiment, the deflection unit is designed, during the machining of the workpiece, in particular welding, to deflect the radiation in the measurement path to (at least) one first position leading in relation to a position of the machining beam on the workpiece, to the position of the machining beam on the workpiece, and to (at least) one second position trailing in relation to the position of the machining beam on the workpiece. As described in EP 2 062 674 A1, which was cited at the outset, during a welding process or during welding machining, the location of the joint and/or of the component to be welded can be detected at the leading first position, the keyhole, for example, the welding penetration depth, can be detected at the position of the machining beam, and the seam geometry of the weld seam formed during the welding can be detected at the trailing second position.

To ensure the best possible signal quality in spite of the different light conditions and/or reflectances in the keyhole and leading and trailing the position of the machining beam, the above-described control unit is used, which controls the ratio between the power portions in the measurement path and in the reference path to a predetermined target ratio and/or (automatically) adapts them to the reflection conditions in the keyhole and/or on the workpiece surface. The target ratio between the power portions in the measurement path and in the reference path can be empirically determined during a preceding measurement and can assume a constant value for all three positions. As was described above, however, it is also possible to dynamically adapt the target ratio between the power portions.

As was described above, in addition the source power of the beam source and/or the exposure time of the detector can be adapted, for example, by controlling the total power incident on the detector. In this manner, the best possible signal quality can be achieved for all measurement tasks, which results in a more accurate measurement result and increases the process stability during the machining, since more precise and faster interventions can be made in the machining process on the basis of the more accurate measurement result, if these should be necessary, to change and/or adapt one or more machining parameters for the optimization of the machining result.

A further aspect of the invention relates to a method for machining a workpiece, in particular on a workpiece processing machine as described above, comprising: generating radiation having a source power, splitting the source power of the radiation between a reference path, in which a retroreflector is arranged, and a measurement path, in which the workpiece is arranged, detecting a total power of the radiation which is reflected and/or scattered from the workpiece in the measurement path and from the retroreflector in the reference path and interferes with one another, and controlling a ratio between a power portion of the detected radiation reflected and/or scattered from the workpiece and a power portion of the detected radiation reflected and/or scattered from the retroreflector to a target ratio by changing the power portion of the total power of the radiation reflected and/or scattered from the retroreflector to the detector wherein the above-mentioned method steps, i.e., generating, splitting, detecting, and controlling, are carried out during the machining, in particular by welding, of the workpiece using a machining beam, in particular using a laser beam. The advantages described above in conjunction with the workpiece processing machine also apply to the method.

Various options exist for changing the power portion of the total power of the radiation reflected from the retroreflector:

In one variant, changing the power portion of the total power of the radiation reflected and/or scattered from the retroreflector comprises a change of the splitting of the source power of the radiation the reference path and the measurement path. Such a change can be performed, for example, by a suitably designed beam splitter, in particular a polarization beam splitter, or in another manner.

In a further variant, changing the power portion of the total power of the radiation reflected from the retroreflector comprises changing, in particular attenuating, the power portion of the radiation in the reference path and/or changing, in particular attenuating, the power portion of the radiation in the measurement path. The attenuation of the power portion can be carried out in different ways.

In one refinement, for the attenuation of the power portion of the radiation in the reference path, a focus position of the radiation in the reference path is changed, specifically preferably by acting on a focusing unit in the reference path, more preferably by moving, in particular by displacing, at least one lens in the reference path. Alternatively or additionally, a tunable optical filter can possibly be arranged in the reference path or one or possibly multiple optical filter units can be moved into the reference path and out of it in a controlled manner.

As described above, the attenuation of the power portion in the reference path can also be carried out in another manner, for example, by changing the reflectivity of the retroreflector.

In a further variant, the method additionally comprises: changing the source power to control the detected total power below a total power threshold value. The total power threshold value is dependent on the upper power limit of the detector and is typically selected in such a way that the detector does not exceed the contrast range, i.e., does not go into saturation.

In a further variant, the reflected and/or scattered back total power of the radiation is detected in a spectrally resolved manner and the method additionally comprises: determining at least one parameter of the spectrally resolved total power, and adapting the target ratio and/or the total power in dependence on the at least one determined parameter. As described above, in this manner a dynamic adaptation of the signal quality to different light conditions can be carried out during the scanning of the workpiece.

DESCRIPTION OF DRAWINGS

Further advantages of the invention result from the description and the drawing. The above-mentioned features and the further features set forth hereafter can also be used alone or in multiples in arbitrary combinations. The embodiments shown and described are not to be understood as an exhaustive list, but rather have exemplary character for the description of the invention.

In the figures:

FIGS. 4A and 4B show schematic illustrations of the spectrally resolved detected total power similar to FIGS. 3A and 3B during the determination of parameters to control a power ratio between a measurement path and a reference path, and FIGS. 5A and 5B show schematic illustrations of the spectrally resolved detected total power during a successful control of the power ratio.

DETAILED DESCRIPTION

In the following description of the drawings, identical reference signs are used for identical or functionally identical components.

Figure 1:
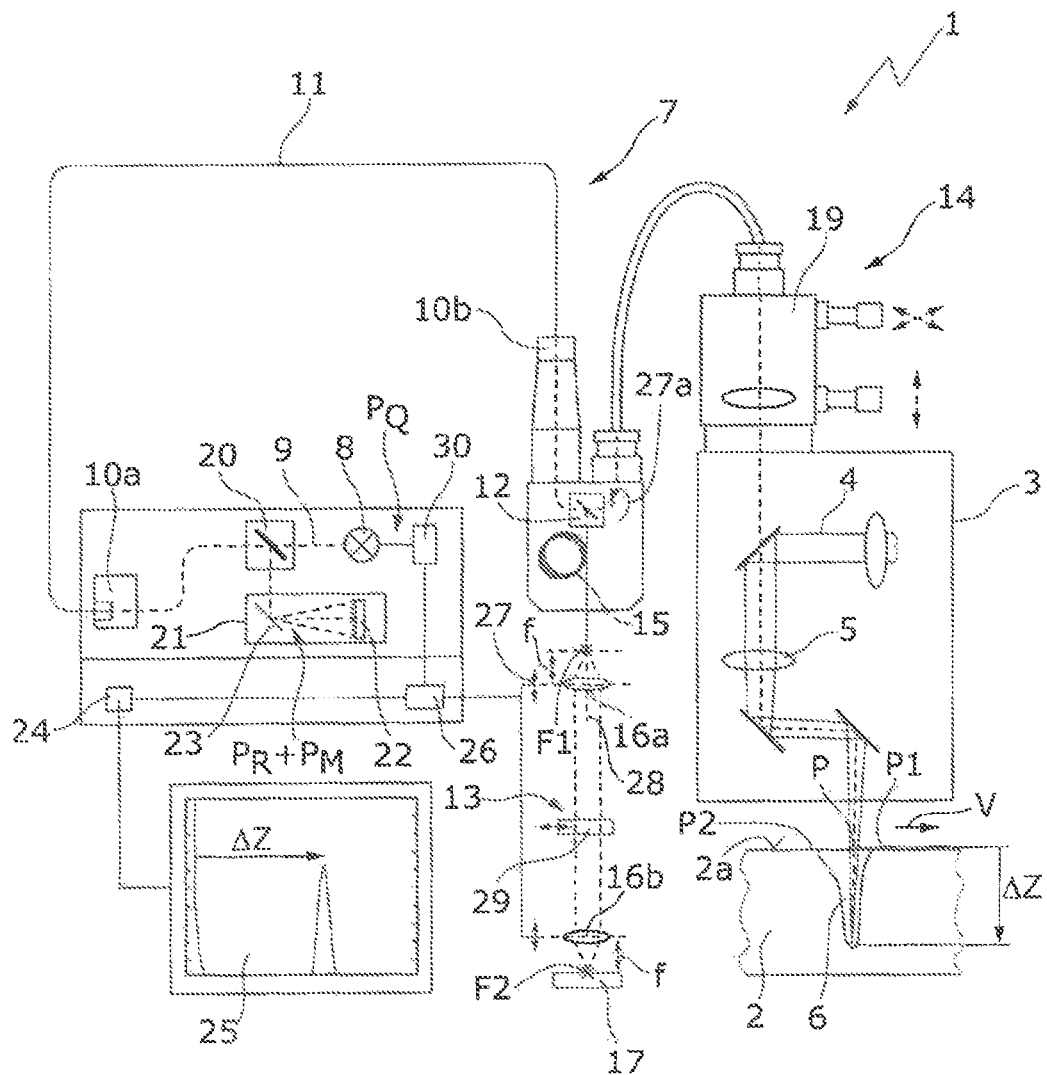
FIG. 1 shows a schematic illustration of an exemplary embodiment of a workpiece processing machine for welding machining of a workpiece having an optical coherence tomography unit for scanning the workpiece during the machining using a laser beam.

FIG. 1 shows an exemplary structure of a workpiece processing machine 1 for machining a workpiece 2, which is welding machining in the example shown. The workpiece processing machine 1 comprises a machining head 3, to which a machining beam, in the example shown a laser beam 4, is supplied by a laser source (not shown). The laser beam 4 is focused on the workpiece 2 at a focusing lens 5 arranged in the machining head 3 and forms a capillary or a keyhole 6 thereon, in which the material of the workpiece 2 is melted and/or partially vaporized. The machining head 3 is moved by means of a movement unit (not shown in greater detail) during the welding process along a feed direction V over the surface 2a of the workpiece 2. It will be understood that alternatively or additionally the workpiece 2 can also be moved by means of a suitable movement unit in relation to the machining head 2.

The workpiece processing machine 1 comprises an optical interferometer in the form of an optical coherence tomography unit 7, which comprises a beam source 8 for generating (measurement) radiation 9. In the example shown, the beam source 8 is a superluminescent diode, which in the example shown generates radiation 9 having a wavelength λ or having wavelengths of greater than 800 nm. It will be understood that the beam source 8 can also be designed to generate radiation 9 at other wavelengths λ. The radiation 9 originating from the beam source 8 initially propagates freely and is coupled into an optical fiber 11 at a coupling optical unit 10a and is coupled out of the optical fiber 11 at an output-side end via an output coupling optical unit 10b before the radiation 9 is incident in free beam propagation on a beam splitter unit in the form of a polarization beam splitter 12.

At the beam splitter 12, the radiation 9, which is generated having a source power $P_Q$ by the beam source 8, is split between a reference path 13 and a measurement path 14. A further optical fiber 15 is arranged in the reference path 13, at the output-side end of which the radiation 9 exits divergently and is collimated by a first lens 16a. A second lens 16b is used for focusing the collimated radiation 9 on a retroreflector in the form of a planar end mirror 17. The radiation 9, more precisely the radiation portion which is coupled into the measurement path 14 by the polarization beam splitter 12, is guided via a deflection unit in the form of a scanner unit 19, which comprises two scanner mirrors (not shown in greater detail) in the example shown, to deflect the radiation 9 in the measurement path 14, before it is coupled into the beam path of the laser beam 4.

With the aid of the scanner unit 19, the radiation 9 in the measurement path 14 can be deflected or aligned at different positions on the workpiece 2. A position P, at which the laser beam 4 is incident on the workpiece 2, a first position P1 leading the position P at which the laser beam 4 is incident on the workpiece 2, and a second position P2 trailing the position P at which the laser beam 4 is incident on the workpiece 2, are shown by way of example in FIG. 1. With the aid of the scanner unit 19, the radiation 9 in the measurement path 14 can be deflected or aligned at all three positions P1, P, P2.

The radiation 9 reflected and/or scattered from the workpiece 2 in the measurement path 14 and the radiation 9 reflected and/or scattered from the end mirror 17 in the reference path 13 is combined at the polarization beam splitter 12 and passes through the optical fiber 11 in the reverse direction. At a further beam splitter 20 arranged in front of the beam source 8, which is designed as a partially-transmissive mirror, the reflected radiation 9 is deflected and supplied to a spectrometer 21, which comprises a detector 22 in the form of a detector line and a diffraction grating 23, at which the reflected and/or scattered radiation 9 is decomposed into its spectral components, which are incident on different detector surfaces of the detector 22 designed as a detector line.

The total power $P_D$ of the radiation 9 which is incident on the detector 22 or on each individual detector surface 22a-k (cf. FIG. 2), is the total of a power portion $P_R$ of the radiation 9, which has passed through the reference path 13 and is reflected and/or scattered at the end mirror 17 back to the detector 22, and a power portion $P_M$ of the radiation 9, which has passed through the measurement path 14 and is reflected and/or scattered at the workpiece 2 back to the detector 22 ($P_D=P_M+P_R$).

For the case in which the splitting of the source power $P_Q$ is carried out at the polarization beam splitter 12 between the reference path 13 having a reference portion $S_R$ and the measurement path 14 having an identical measurement portion $S_M$, i.e., $S_R=S_M=0.5$ (wherein $S_R+S_M=1$), the following applies for the total power $P_D$, which is incident on the detector 22, more precisely on each individual detector surface 22a-k:

$$I_D(k)=\rho P_D(k)=\rho [P_R(k)+P_M(k)],$$

wherein $k=2\pi/\lambda$ denotes the wave number (in [m$^{-1}$]), $\lambda$ denotes the wavelength of the radiation 9 or of the respective radiation portion, $I_D(k)$ denotes the measurement current at the respective detector surface 22a-k, and $\rho$ denotes the proportionality constant between incident power $P_D(k)$ and the measurement current $I_D(k)$ proportional thereto ($\rho$, for example, in ampere/watt).

The measurement current $I_D(k)$ comprises three components (a)-(c), which are indicated hereafter:

$$I_D(k) =$$

$$\frac{\rho}{4}[P_Q(k)(R_R + R_{S1} + R_{S2} + \ldots)] \qquad (a)$$

$$+\frac{\rho}{4}\left[P_Q(k)\sum_{n=1}^{N}\sqrt{R_R R_{Sn}}(\cos[2k(z_R - z_{Sn})])\right] \qquad (b)$$

$$+\frac{\rho}{4}\left[P_Q(k)\sum_{n\neq m=1}^{N}\sqrt{R_{Mn} R_{Sm}}(\cos[2k(z_{Sn} - z_{Sm})])\right] \qquad (c)$$

Figure 2:
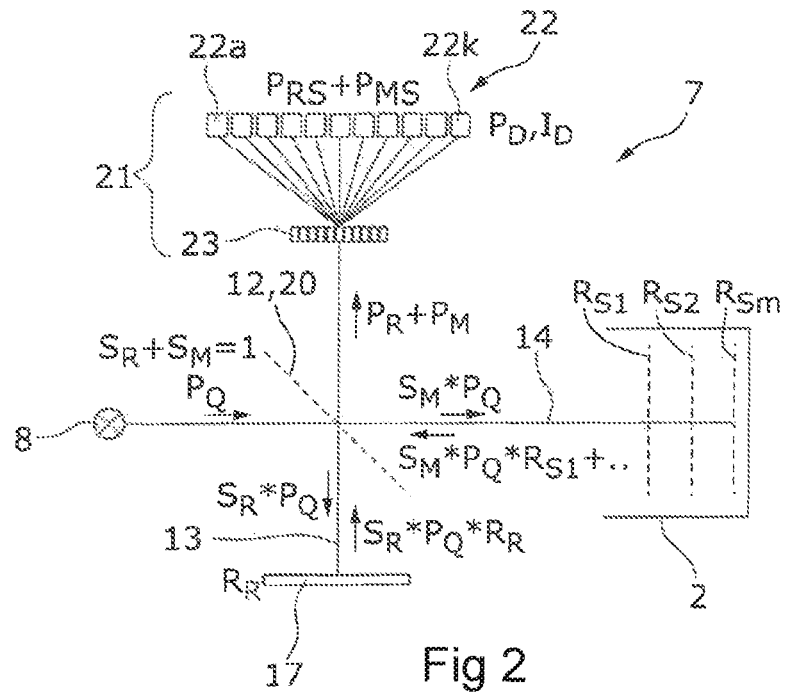
FIG. 2 shows a simplified illustration of a beam path in the optical coherence tomography unit of FIG. 1 having a measurement path and having a reference path.

For the explanation of the meaning of the variables used in the components (a)-(c), reference is made to FIG. 2, which shows a simplified illustration of the optical coherence tomography unit 7 having the reference path 13 and the measurement path 14. As can be inferred from FIG. 2, $R_R$ denotes the reflectivity of the end mirror 17 and $R_{S1}$, $R_{S2}$, ..., $R_{SN}$ denote the reflectivity of the workpiece 2 in different measurement planes, which each correspond to different depths in the workpiece 2. The optical path length $z_R$, which the radiation 9 covers in the reference path 13, and the optical path length $z_S$ or $z_{Sn}$, which the radiation 9 covers in the measurement path 14 to the respective measurement plane 1, n, N, are not shown in FIG. 2.

The first component (a) is a so-called DC component, i.e., a constant component which is determined, for example, by means of a black adjustment before the beginning of the detection or measurement and which is filtered out during the detection from the total power $P_R(k)+P_M(k)$ detected by the detector 22 or the measurement current $I_D(k)$ proportional thereto. The DC component (a) reduces the contrast range of the detector 22 and should therefore turn out to be as small as possible.

The second component (b) is a so-called cross-correlation component, which contains the actual depth information, i.e., the actual desired measurement signal, as an interferometric signal component. The auto-correlation component (c) contains, in the case of the reflection at different measurement planes 1, N at the workpiece 2, interference components between different measurement planes 1, . . . , N. The auto-correlation component (c) involves artifacts which corrupt the actual measurement result, i.e., the auto-correlation component (c) should also turn out to be as small as possible.

FIG. 1 also shows an evaluation unit 24, which records and analyzes the total power $P_R(k)+P_M(k)$, which is incident on the detector 22, more precisely the measurement signal $I_D(k)$ proportional thereto, spectrally resolved in dependence on the wave number k. On the basis of the spectrally resolved total power $P_R+P_M$, information about the welding process can be determined, for example, about the welding penetration depth $\Delta Z$, which can be determined in the spectrum 25 shown in FIG. 1 on the basis of a spectral distance between two peaks in the recorded spectrum 25, as indicated by way of example in FIG. 1.

Figure 3A:
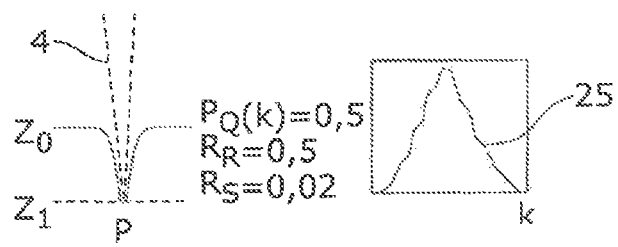
FIGS. 3A and 3B show illustrations of the spectrally resolved detected total power of the radiation of a beam source of the optical coherence tomography unit, which is incident on the workpiece and reflected thereby at the position of a machining beam and at two positions leading and trailing the position of the machining beam.
Figure 3B:
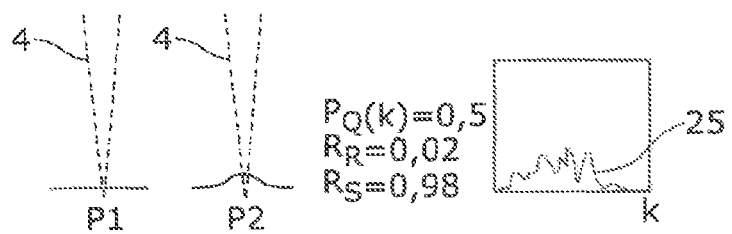

As can be seen in FIGS. 3A and 3B, the spectrally resolved total power $P_R+P_M$ and thus the associated spectrum 25 are strongly dependent on the power portion $R_S$ reflected at the workpiece 2 (and/or on the power portion $R_{S1}$, . . . , $R_{SN}$ reflected at the workpiece 2 in a respective measurement plane), which refers in FIGS. 3A and 3B to the total source power $P_Q$ and is in turn dependent on the position P, P1, P2, at which the radiation 9 in the measurement path 14 is incident on the workpiece 2. In the example shown in FIG. 3A, in which the radiation 9 is incident at the position P of the laser beam 4 on the workpiece 2, the power portion $R_S$ of the source power $P_Q$ reflected at the workpiece 2 is comparatively small and is, for example, $R_S=0.02$, while the power portion $R_R$ reflected at the end mirror 17 of the source power $P_Q$ is approximately 0.5, i.e., $R_R<<1-R_S$, which results in a comparatively large DC component (a), as is recognizable in FIG. 3A on the basis of the comparatively tall or large spectrum 25.

In the example shown in FIG. 3B, the radiation 9 in the measurement path 14 is reflected from the first position P1 leading the position P of the laser beam 4 and/or from the second position P2 trailing the position P of the laser beam 4. At these two positions P1, P2, the power portion $R_S$ reflected at the workpiece 2 or at the surface 2a of the workpiece 2 of the source power $P_Q$ is comparatively large, for example, $R_S=0.98$, while for the radiation portion $R_R$ reflected at the end mirror 17: $R_R=0.02$, so that: $R_S \approx 1-R_R$. In this case, the auto-correlation component (c) of the spectrum 25 is excessively large and it is comparatively irregular.

To obtain the highest possible signal quality and/or a good signal-to-noise ratio as independently as possible of the possibly strongly differing reflectivity $R_S$ of the workpiece 2, the workpiece processing machine 1 shown in FIG. 1 comprises a control unit 26, to control the ratio between the power portion $P_R$ of the radiation 9 in the measurement path 14 reflected back from the workpiece 2 to the detector 22 to the power portion $P_M$ of the radiation 9 in the reference path 13 reflected back from the end mirror 17 to a target ratio $P_{MS}/P_{RS}$. The target ratio $P_{MS}/P_{RS}$ can in particular be a constant value, which is preferably between approximately 0.01 and approximately 100, more preferably between 0.1 and 10 and is ideally $P_{MS}/P_{RS}=1$.

To carry out the control, the control unit 26 can first determine by computation the (actual) power portion $P_R$ of the radiation 9 from the reference path 14 which is reflected to the detector 22, for example in the following manner:

$$P_R=S_R^2 P_Q R_R,$$

wherein $S_R$ denotes the reference portion of the source power $P_Q$ of the radiation 9 which is coupled into the reference path 14 (see above) and $R_R$ denotes the reflectivity of the end mirror 17. The squaring of the reference component $S_R$ of the source power $P_Q$ in the above equation is to be attributed to the fact that there are two passes through the beam splitter 12. On the basis of the total power $P_D$, which is incident on the detector 22, the (actual) power portion $P_M$ of the measurement path can be determined in the evaluation unit 24 as $P_M=P_D-P_R$.

With the aid of the actual ratio $P_M/P_R$ determined in this—or possibly in another manner—the control to the desired target ratio $P_{MS}/P_{RS}$ can be performed in the control unit 26. For this purpose, the control unit 26 can act on an adjustment element 27, which enables it to change the power portion $P_R$ in the reference path 13. In the example shown in FIG. 1, the adjustment element 27 is designed as a movement unit, which is used for moving, more precisely for displacing the first lens 16a in the reference path 13 along the beam axis 28 of the reference path 13.

The focus position F1 of the first lens 16a is changed by the displacement of the first lens 16a, so that it is no longer in the plane of the output-side end of the optical fiber 11, i.e., the distance between the output-side end of the optical fiber 11 and the first lens 16a no longer corresponds to the focal length f of the first lens 16a, whereby the radiation 9 in the reference path 13 becomes defocused, which results in an attenuation of the radiation 9 reflected back to the detector 22. This attenuation A can be considered to be a (for example, percentage) reduction of the reflectance $R_R$ in the reference path 13, i.e., the reduced reflectance $R_R*A$ is no longer exclusively determined by the reflectivity $R_R$ of the end mirror 17.

Additionally or alternatively, the adjustment element 27 can also be designed to displace the second lens 16b in the reference path 13 in the direction of the beam axis 28, whereby the further above-described defocusing or attenuation occurs with respect to the distance between the second lens 16b and the end mirror 17. It will be understood that in the workpiece processing machine 1 shown in FIG. 1, the second lens 16b is not absolutely necessary, i.e., it is not absolutely necessary to focus the collimated radiation 9 in the reference path 13 on the end mirror 17.

The adjustment element 27 can also act directly on the end mirror 17 to change its reflectivity $R_R$, without having to act on the lenses 16a, b for this purpose, for example, by rotating the end mirror 17 around its axis. It is also possible that the adjustment element 27 moves an optical filter unit 29 shown in FIG. 1 into the beam path of the reference path 13 and back out of it, as also indicated in FIG. 1 by a double arrow, whereby an attenuation A or a change of the reflectance $A*R_R$ in the reference path 13 also occurs. Alternatively or additionally, the or an optical filter unit 29 can also be arranged permanently in the beam path of the reference path 13, wherein the filter action or the attenuation A of the optical filter unit can be changed with the aid of the control unit 26, i.e., it is a controllable optical filter unit 29.

The adjustment element 27a for changing the power portion PR, which is reflected from the reference path 13 back to the detector 22, can also be used to change the splitting of the source power $P_R$ of the beam source 8 between the reference path 13 and the measurement path 14, i.e., the ratio $S_R$ to $S_M$. For this purpose, the or an adjustment element 27a can act, for example, in a suitable manner on the (polarization) beam splitter 12, for example, by rotating it around the beam axis of the radiation 9 incident thereon from the beam source 8, as indicated in FIG. 1, whereby the ratio $S_R/S_M$ and thus also the ratio of the power portions $P_R/P_M$ typically changes.

In the example shown, the control unit 26, in addition to controlling the ratio of the power portions $P_R/P_M$, is also used to control the total power $P_R+P_M$, which is incident on the detector 22, specifically to a value which is less than a total power threshold value $P_{RS}+P_{MS}$, which is predefined by the sensitivity of the detector 22 and is not supposed to be exceeded in order to avoid the detector 22 going into saturation or exceeding its contrast range. To achieve this, the control unit 26 acts on a further adjustment element 30, which in the example shown is a controllable current source for supplying a current signal to the beam source 8 in the form of the superluminescent diode. With the aid of the further adjustment element 30, the source power $P_Q$ of the beam source 8 can thus be changed, whereby the total power $P_R+P_M$ incident on the detector 22 can be controlled so that it is always less than the total power threshold value $P_{RS}+P_{MS}$.

FIGS. 4A and 4B show by way of example the spectrally resolved total power $P_R+P_M$ incident on the detector 22 or a spectrum 25 resulting therefrom for the first measurement plane (n=1) or for a measurement plane (n>1) located deeper in the workpiece 2, respectively, in dependence on the wave number k. With the aid of the evaluation unit 24, characteristic parameters in the respective spectrum 25 can be determined, which can be used by the control unit 26 for the control. For example, at the wave number at which the maximum of the current or the total power $P_R+P_M$ is measured, the mean value of the reflectivity $R_R$ of the reference path 13 and the reflectivity $R_S$ of the workpiece 2 may be read, i.e., it may be determined as a parameter $(R_R+R_{S1})/2$. The proportionality factor $\sqrt{R_R R_{S1}}$ of the cross-correlation component (b) can also be determined on the basis of the spectrum 25 and in this manner, for example, the reflectivity $R_{S1}$ of the workpiece 2 at the first measurement plane (n=1) may be determined.

On the basis of the at least one parameter, for example, the proportionality factor $\sqrt{R_R R_{S1}}$ of the cross-correlation component (b), the target ratio $P_{MS}/P_{RS}$ and/or the total power $P_R+P_M$ can be adapted suitably to optimize the signal-to-noise ratio. However, it will be understood that both the target ratio $P_{MS}/P_{RS}$ and also the total power $P_R+P_M$ can be controlled to a predetermined, constant value. In this case, an adjustment of the detector 22 for adaptation to different types of material, etc., can be disposed with.

FIGS. 5A and 5B show two spectra 25, which were optimized with the aid of the control unit 26 so that both the DC component (a) and also the auto-correlation component (c) are comparatively small, so that essentially the cross-correlation component (b) containing the depth information remains. The underlying light conditions during the recording of the two spectra 25 are very different and correspond to the light conditions or reflectances $R_S$ of the workpiece 2 shown in FIGS. 3A and 3B. As the comparison of FIG. 5A and FIG. 5B shows, the two spectra 25 only differ insignificantly in spite of the very different light conditions on the workpiece 2, i.e., the signal quality is high both at the two positions P1, P2 leading and trailing the position P of the laser beam 4 and also at the position P of the laser beam 4 itself.

Although welding machining of the workpiece 2 was described above, the optimization of the signal quality can also advantageously be performed in other machining processes which are carried out by means of the workpiece processing machine 1 or a suitably modified workpiece processing machine 1. For example, the machining can be a (laser) cutting process or a (laser) drilling process. The above-described method can also be used in optical interferometers other than an optical coherence tomography unit, since the problem also occurs therein that the signal quality or the signal-to-noise ratio cannot be optimized by the change of the exposure time of the detector 22 and/or by the change of the source power $P_Q$ without an adaptation of the power ratio $P_R/P_M$. The workpiece 2 does not necessarily have to be a metallic workpiece 2 (a plate), rather other objects can also be machined with the aid of the workpiece processing machine 1, which are denoted as the workpiece 2 in the present application for simplification.

What is claimed is:

1. A workpiece processing machine comprising:
a beam emission head configured to provide a machining beam configured to process a workpiece;
an optical interferometer comprising:
a beam source for generating measurement radiation;
a beam splitter configured to split the measurement radiation between a reference path and a measurement path, wherein the workpiece is positioned within the measurement path,
a retroreflector positioned within the reference path, and
a detector configured to detect a total power of the beam redirected to the detector from the workpiece along the measurement path and from the retroreflector along the reference path,
an adjustment element configured to change a second power portion of the total power of the beam redirected from the retroreflector to the detector, and further configured to change the splitting of the source power of the beam between the reference path and the measurement path; and
one or more controllers configured to act on the adjustment element to control a ratio between a first power portion of the beam redirected from the workpiece to the detector and the second power portion of the beam redirected from the retroreflector to the detector;
wherein the adjustment element is configured to change the power portion of the beam in the reference path, and
wherein the adjustment element is configured to act on a focusing unit to change a focus position of the beam in the reference path.

2. The workpiece processing machine of claim 1, wherein the adjustment element is configured to change a reflectivity of the retroreflector positioned within the reference path.

3. The workpiece processing machine of claim 1, wherein the focusing unit comprises a movable lens displaceable along a beam axis of the reference path.

4. The workpiece processing machine of claim 1, wherein the adjustment element comprises an optical filter unit.

5. The workpiece processing machine of claim 1, wherein the adjustment element is a first adjustment element and the workpiece processing machine further comprises a further adjustment element configured to change the source power of the beam source, wherein the one or more controllers are configured to actuate the further adjustment element to control the total power redirected to the detector below a total power threshold value.

6. The workpiece processing machine of claim 1, wherein the optical interferometer comprises an optical coherence tomography unit.

7. The workpiece processing machine of claim 6, wherein the optical coherence tomography unit is configured to spectrally resolve detection of the total power reflected back to the detector.

8. The workpiece processing machine of claim 7, further comprising an evaluation unit that determines at least one parameter of the spectrally resolved total power, wherein the one or more controllers are configured to adapt at least one of the target ratio and the total power based on the at least one parameter.

9. The workpiece processing machine of claim 1, further comprising a scanner comprising one or more scanning mirrors configured to deflect the beam in the measurement path to different positions on the workpiece.

10. The workpiece processing machine of claim 9, wherein the scanner is configured to deflect the beam in the measurement path to a first position leading in relation to a position of the machining beam on the workpiece, to the position of the machining beam on the workpiece, and to a second position trailing in relation to the position of the machining beam on the workpiece.

11. The workpiece processing machine of claim 1, wherein the beam comprises a laser beam.

12. The workpiece processing machine of claim 5, wherein the further adjustment element is a controllable current source.

13. A method of processing a workpiece, the method comprising:
generating a beam having a source power,
splitting the source power of the beam between a reference path, which comprises a retroreflector arranged within the reference path, and a measurement path,
detecting a total power of the beam, wherein the beam comprises a first beam that is redirected by the workpiece along the measurement path and a second beam that is redirected by the retroreflector along the reference path, wherein the first beam and the second beam interfere with one another, and
controlling a ratio between a power portion of the detected beam redirected from the workpiece and a power portion of the detected beam redirected from the retroreflector to a target ratio by adjusting the power portion of the total power of the beam redirected from the retroreflector to the detector, during processing of the workpiece by changing the splitting of the source power of the beam between the reference path and the measurement path;
wherein adjusting the power portion of the total power of the beam redirected from the retroreflector comprises at least one of attenuating the power portion of the beam in the reference path; and
wherein attenuating the power portion of the beam in the reference path comprises changing a focus position of the beam in the reference path.

14. The method of claim 13, further comprising changing the source power to control the detected total power below a total power threshold value.

15. The method of claim 13, further comprising:
detecting the total power of the beam redirected back in a spectrally resolved manner,
determining at least one parameter of the spectrally resolved total power, and
adapting at least one of the target ratio and the total power based on the at least one determined parameter.

16. A workpiece processing machine comprising:
a beam emission head configured to provide a machining beam configured to process a workpiece;
an optical interferometer comprising:
a beam source for generating measurement radiation;
a beam splitter configured to split the measurement radiation between a reference path and a measurement path, wherein the workpiece is positioned within the measurement path,
a retroreflector positioned within the reference path, and
a detector configured to detect a total power of the beam redirected to the detector from the workpiece along the measurement path and from the retroreflector along the reference path,
an adjustment element configured to change a second power portion of the total power of the beam redirected from the retroreflector to the detector; and one or more controllers configured to act on the adjustment element to control a ratio between a first power portion of the beam redirected from the workpiece to the detector and the second power portion of the beam redirected from the retroreflector to the detector, wherein the adjustment element is configured to change the power portion of the beam in the reference path, and wherein the adjustment element is configured to act on a focusing unit to change a focus position of the beam in the reference path.

17. The workpiece processing machine of claim 16, wherein the adjustment element is configured to change the splitting of the source power of the beam between the reference path and the measurement path.

18. The workpiece processing machine of claim 16, wherein the adjustment element is configured to change a reflectivity of the retroreflector positioned within the reference path.

19. The workpiece processing machine of claim 16, wherein the focusing unit comprises a movable lens displaceable along a beam axis of the reference path.

20. The workpiece processing machine of claim 16, wherein the adjustment element comprises an optical filter unit.

21. The workpiece processing machine of claim 16, wherein the adjustment element is a first adjustment element and the workpiece processing machine further comprises a further adjustment element configured to change the source power of the beam source, wherein the one or more controllers are configured to actuate the further adjustment element to control the total power redirected to the detector below a total power threshold value.

22. The workpiece processing machine of claim 21, wherein the further adjustment element is a controllable current source.

23. The workpiece processing machine of claim 16, wherein the optical interferometer comprises an optical coherence tomography unit.

24. The workpiece processing machine of claim 23, wherein the optical coherence tomography unit is configured to spectrally resolve detection of the total power reflected back to the detector.

25. The workpiece processing machine of claim 24, further comprising an evaluation unit to determine at least one parameter of the spectrally resolved total power, wherein the one or more controllers are configured to adapt at least one of the target ratio and the total power based on the at least one parameter.

26. The workpiece processing machine of claim 16, further comprising a scanner comprising one or more scanning mirrors configured to deflect the beam in the measurement path to different positions on the workpiece.

27. The workpiece processing machine of claim 26, wherein the scanner is configured to deflect the beam in the measurement path to a first position leading in relation to a position of the machining beam on the workpiece, to the position of the machining beam on the workpiece, and to a second position trailing in relation to the position of the machining beam on the workpiece.

28. The workpiece processing machine of claim 16, wherein the beam comprises a laser beam.

29. A method of processing a workpiece, the method comprising:

generating a beam having a source power, splitting the source power of the beam between a reference path, which comprises a retroreflector arranged within the reference path, and a measurement path, detecting a total power of the beam, wherein the beam comprises a first beam that is redirected by the workpiece along the measurement path and a second beam that is redirected by the retroreflector along the reference path, wherein the first beam and the second beam interfere with one another, and controlling a ratio between a power portion of the detected beam redirected from the workpiece and a power portion of the detected beam redirected from the retroreflector to a target ratio by adjusting the power portion of the total power of the beam redirected from the retroreflector to the detector, during processing of the workpiece, wherein adjusting the power portion of the total power of the beam redirected from the retroreflector comprises at least one of attenuating the power portion of the beam in the reference path, and wherein attenuating the power portion of the beam in the reference path comprises changing a focus position of the beam in the reference path.

30. The method of claim 29, wherein adjusting the power portion of the total power of the beam redirected from the retroreflector comprises changing the splitting of the source power of the beam between the reference path and the measurement path.

31. The method of claim 29, further comprising changing the source power to control the detected total power below a total power threshold value.

32. The method of claim 29, further comprising:

detecting the total power of the beam redirected back in a spectrally resolved manner, determining at least one parameter of the spectrally resolved total power, and adapting at least one of the target ratio and the total power in dependence on the at least one determined parameter.

* * * * *